United States Patent Office 2,768,203
Patented Oct. 23, 1956

2,768,203

PREPARATION OF GUANIDINE SULFATE

Richard W. Hamilton, Darien, Conn., assignor to American Cyanamid Company, New York, N. Y., a corporation of Maine No Drawing. Application August 30, 1954,
Serial No. 453,127

3 Claims. (Cl. 260—564)

The present invention relates to an improvement in the art of preparing guanidine sulfate, and more particularly to the preparation of guanidine sulfate in a high temperature reaction vessel.

It is known that guanidine sulfate is formed by reacting together urea, sulfur dioxide and ammonia in a closed vessel at a temperature within the range of about 190° C. to 300° C. However, utilization of this important process has been handicapped by the lack of a satisfactory reaction vessel. The reaction conditions, particularly due to the use of sulfur dioxide, are extremely corrosive to the metals most commonly utilized in fabricating chemical apparatus. Vessels constructed of iron, nickel, Monel metal and stainless steels are severely corroded in a few hours. Moreover, guanidine sulfate produced in such containers is a low-grade, undesirable product. Glass-lined vessels may withstand the corrosive action of the reaction mixture but frequently fail from thermal shock.

It is an object of this invention to provide a reaction vessel for the synthesis of guanidine sulfate which is more durable than those heretofore employed. It is a further object to provide a vessel in which guanidine sulfate of high purity can be formed by reacting together urea, sulfur dioxide and ammonia at a temperature within the range of about 190° C. to 300° C. Other objects of the invention will appear hereinafter.

These objects are accomplished by utilizing a vessel consisting of titanium. The entire reaction vessel can be formed of titanium, but preferably the vessel can be one of the common structural metals such as stainless steel having an inner surface or lining consisting of titanium.

Despite its known resistance to attack by liquors containing sulfuric acid, even in the presence of oxygen, the ability of titanium to resist the corrosive action caused by sulfur dioxide in the present process is very surprising. Particularly is this true in view of the unsatisfactory results previously obtained in vessels of various metallic constitution which are considered corrosion resistant but will not withstand attack by liquors containing sulfur dioxide. Vessels previously employed, such as autoclaves constructed of nickel, Monel metal and stainless steel are severely pitted and corroded by the sulfur dioxide and the discolored guanidine sulfate is contaminated with corrosion byproducts.

The following examples will further illustrate the invention.

Example 1

15 g. (0.25 mol) of urea, 48 g. (0.75 mol) of sulfur dioxide and 17 g. (1.0 mol) of ammonia were heated together in a 300-cc. titanium autoclave at 220° C. for a period of two hours. The autoclave was cooled and vented, and the reaction mixture was added to a vessel containing 300 cc. of water. The resulting slurry was filtered, and a liter of acetone was added to the filtrate. The precipitated guanidine sulfate was filtered off and dried at room temperature. The yield of guanidine sulfate was equivalent to a urea conversion of 88%. The product was free from discoloring impurities, and the autoclave showed no visible corrosion.

Example 2

30 g. of urea, 96 g. of sulfur dioxide and 34 g. of ammonia were charged to the autoclave employed in Example 1, and heated for five hours at 260° C. The autoclave was then cooled to room temperature and vented. The guanidine sulfate was recovered according to the procedure of Example 1. The yield of the white crystalline product was equivalent to a urea conversion of 69%. The autoclave showed no visible corrosion.

The guanidine sulfate provided by the process of the present invention is a valuable compound, being particularly useful in the preparation of resins and blueprint materials, and as an intermediate in the preparation of chemotherapeutic agents, explosives, pharmaceuticals and surface-active agents.

While the invention has been described with particular reference to specific embodiments, it is to be understood that it is not to be limited thereto but is to be construed broadly and restricted solely by the scope of the appended claims.

I claim:

1. A process of making substantially colorless guanidine sulfate which comprises: at a temperature of from about 190° C. to about 300° C., confining a reactive mixture comprising urea, sulfur dioxide and ammonia in a closed vessel at least the inner surface of which is metallic titanium, heating so-confined mixture sufficiently to maintain said temperature until reaction of urea substantially ceases, stopping the heating and collecting resultant guanidine sulfate.

2. The process according to claim 1 in which the urea:sulfur dioxide:ammonia mol ratio is approximately 0.25:0.75:1.0.

3. The process according to claim 1 in which the reaction is conducted at a temperature within the range of 220° C. to 260° C.

References Cited in the file of this patent

Abstract of appl. Ser. No. 201,060, 671 O. G. 1499, pub. June 30, 1953.